Oct. 28, 1969 R. E. FEARON ET AL 3,475,239
EXOTHERMIC COMPOSITION CONTAINING A METAL OXIDE
AND ACID OR ACID SALTS
Filed Nov. 4, 1968 2 Sheets-Sheet 1

INVENTORS
ROBERT E. FEARON
RUDOLPH G. FOSS
BY
ATTORNEY

United States Patent Office 3,475,239
Patented Oct. 28, 1969

3,475,239
EXOTHERMIC COMPOSITION CONTAINING A METAL OXIDE AND ACID OR ACID SALTS
Robert Earl Fearon and Rudolph George Foss, Tulsa, Okla., assignors to Ciba Corporation, Summit, N.J., a corporation of Delaware
Filed Nov. 4, 1968, Ser. No. 772,991
Int. Cl. F24j 1/02
U.S. Cl. 149—109       7 Claims

ABSTRACT OF THE DISCLOSURE

Exothermic compositions are provided which are comprised of a particulate oxide of an alkali metal or alkaline earth metal and a solid, particulate acid or strongly acid salt. The alkaline oxide is present in the composition in an amount sufficient to at least neutralize the acidic reactant, and preferably in an amount in excess of the theoretical amount required for neutralization. The exothermic compositions of this invention are useful in a plurality of applications wherein a controlled amount of heat is desired, such as curing of resinous materials, heating of foods, defrosting of frozen articles and other similar applications.

Packages are also provided which are adapted to hold the alkaline oxide reactant and acidic reactant separately from each other until immediately before use, whereupon the oxide and acidic reactants are blended together in the package, which is then secured to the object to be heated, for example, a pipe joint, and the exothermic reaction is initiated by injecting a small amount of water into the exothermic composition.

BACKGROUND OF THE INVENTION

This invention relates to exothermic compositions and to packages containing said compositions. More particularly, this invention is concerned with exothermic compositions which may be employed to impart a controlled amount of heat to articles to be heated. This invention will be described with particular reference to use of the compositions and packages of the present invention to accelerate the cure of thermosetting adhesives used as the bonding agent for joining plastic pipe. However, this invention is not limited to the above-noted utility and may be employed in other applications wherein a controlled amount of heat is desired, such as in heating of food and defrosting of frozen articles.

Laminated plastic pipe, for example, fiber glass reinforced epoxy pipe, is utilized in various types of commercial installations. In particular, this type of piping is especially useful in oil fields and in chemical plants where corrosion resistance is important. In order to obtain maximum corrosion resistance and strength, the pipe joints are generally made by bonding the pipe joints together with a thermosetting resinous adhesive, for example, an epoxy resin.

Under normal conditions the curing of resinous adhesives does not present any significant problem. The bonding agent can be formulated to cure at temperatures down to about 40° F. The cure at the lower temperature is, however, generally quite slow. At temperatures below about 40° F. the commercially available bonding agents will not cure, or if they do cure, cure is extremely slow.

The installation of pipe systems is not always conducted under ideal working conditions. In the winter, especially in the more northern areas, the temperature is often below 40° F. for extended periods of time. Since the pipe joints should be completely cured before the work crews leave the job site, it was necessary to provide means to accelerate the cure of the adhesive.

DESCRIPTION OF THE PRIOR ART

Various methods were suggested in the prior art to accelerate the cure. One suggestion was to simply heat the joints with a torch. This was completely unsatisfactory. The operators who install the pipe in the field are, at best, only semiskilled. Each operator used a different technique. Some did not heat the joints enough to cure the adhesive. Others overheated the joints, charring the pipe, which considerably weakened the pipe. Furthermore, the use of an open flame was highly undesirable, especially in oil and gas fields.

To overcome the nonuniformity of heating, it was suggested to apply a ring of a flammable material about the joint and ignite the ring so that it would burn and thereby heat the joint. This method was not completely successful because the amount of heat produced was somewhat high. Furthermore, it was also objectionable because of the presence of an open flame.

A further method was suggested in which heat sinks were employed. In this method, metal rings were provided which were heated and then placed about the joints. The heat from the heat sink was then transferred to the joint. This system was not satisfactory in that the upper limits of the heating were not accurately controlled. Furthermore, this method required the purchase of sets of heat sinks for each diameter of pipe, and the heat sinks had to be accurately made so as to closely conform to the outer surface of the pipe. A further disadvantage was that the heat sinks had to be recovered from the joints after use, which somewhat slowed installation rates.

In another method suggested in the prior art, an electrically heated blanket was wrapped about the joint. This method produced satisfactory results in that the temperature could be controlled. However, this method was not satisfactory in that it required the transportation to the job site of relatively heavy and expensive electrical equipment. Furthermore, the necessity of employing 110 volt current under field conditions of rain, ice, and snow was not completely acceptable because of the inherent danger of electrical shock to the operators using the equipment.

In an attempt to overcome the problems encountered with the above-described prior art methods, various exothermic compositions, which were suggested in the prior art for other purposes, were evaluated for possible use in curing the adhesive used to join elastic pipes. None of the compositions evaluated proved to be satisfactory. The combination of aluminum foil and a solution of caustic soda proved to be too dangerous and unpredictable. The residues that were left were harmful to animal life. Other types of exothermic reactions required the addition of large amounts of water to produce the desired reaction. Since the heating of the joints is only required at near or below the freezing point of water, the necessity of maintaining relatively large quantities of water above the freezing point for use with the heat packs was a distinct disadvantage. Certain other types of exothermic compositions were too expensive to employ in a commercial process of the type under study. A further problem encountered with certain exothermic compositions was that the compositions were so reactive that they could not safely be sent by common carrier or through the mail.

It can be seen from the above discussion that the ideal method for promoting the cure of the adhesives used to join plastic pipe should have certain properties. The elements required for the method must be portable, preferably as light in weight as possible. The materials employed must be inexpensive and must not cause any substantial fire hazard. Most important, a controlled amount of heat must be produced which is sufficient to cure the adhesive, but which will not damage the pipe. There should also be a visual indication that the method, in operation, is producing heat. Any residue remaining should be nonpoisonous to animal life. The compositions employed should also be shipable by common carrier or through the mail.

SUMMARY OF THE INVENTION

Exothermic compositions have been provided which are comprised of a particulate oxide of an alkali or alkaline earth metal and a solid, particulate acid or strongly acid salt, or mixtures thereof. The proportion of the alkaline and acidic reactants is selected so that at least an amount of the alkaline oxide reactant is present in the composition which, when converted to the corresponding hydroxide, will neutralize the acidic reactant. Advantageously, an excess of the oxide is employed in order to obtain higher temperatures.

A heat collar is provided wherein the alkaline oxide reactant is packaged in one section and the acidic reactant is packaged in another separate section. The heat collar is adapted so that the alkaline and acidic reactants can be mixed immeditely before being used. The heat collar is then secured to the pipe joint and the exothermic reaction is initiated by injecting a small amount of water through the heat collar into the composition contained therein.

Figure 1:
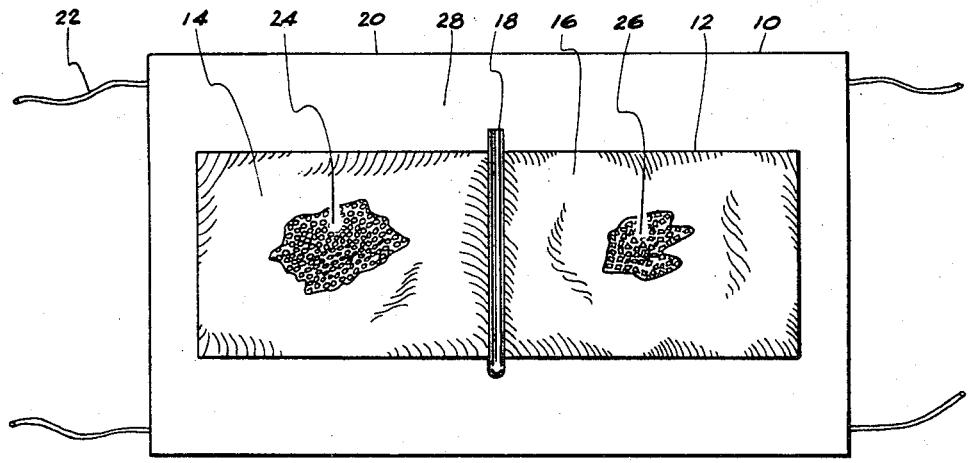
FIG. 1 is a top plan view in partial section of a typical heat collar of the present invention, which is especially adapted for use with bell and spigot-type joints.
Figure 2:
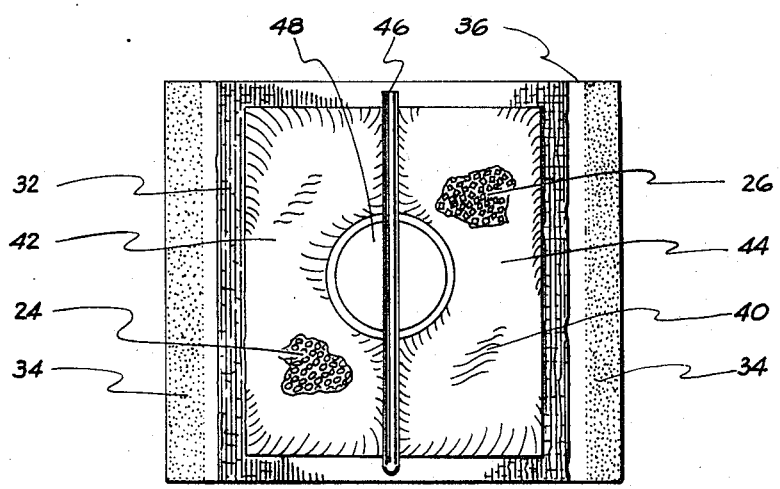
FIG. 2 is a top plan view in partial section of a heat collar of the present invention which is especially suitable for making saddle-type pipe joints.
Figure 3:
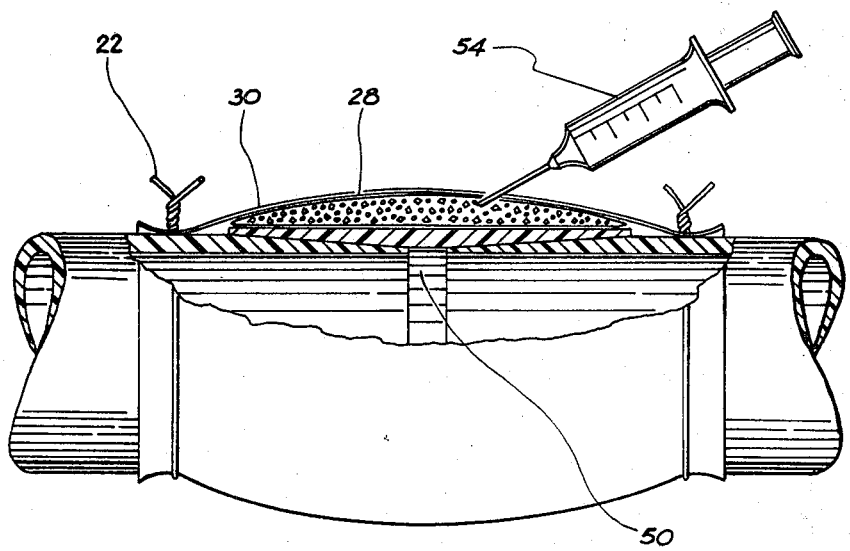
FIG. 3 is a side view in partial cross-section illustrating the heat collar of FIG. 1 in position on a bell and spigot-type pipe joint.
Figure 4:
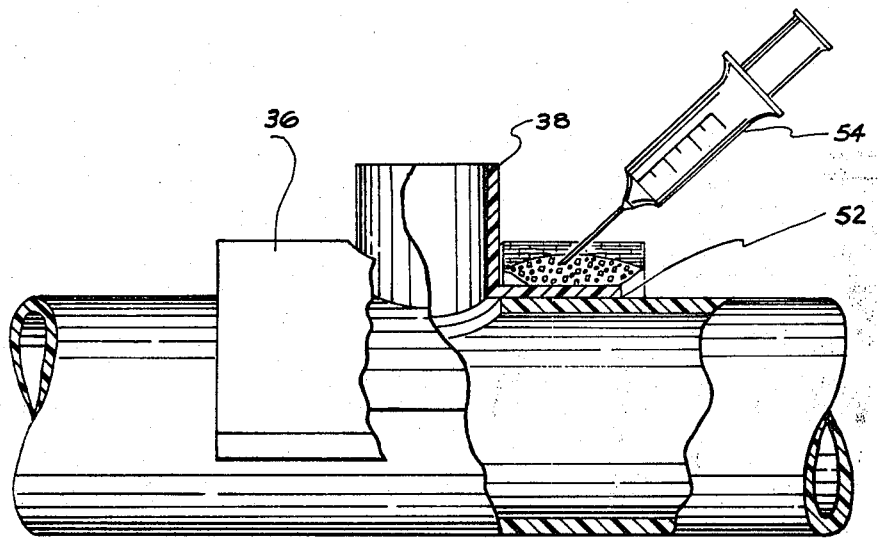
FIG. 4 is a side view in partial cross-section of the heat collar of FIG. 3 in position on a saddle-type pipe joint.

In describing the preferred embodiments of the invention illustrated in the drawing, specific terminology will be resorted to for the sake of clarity. However, it is not intended to be limited to the specific terms so selected, and it is to be understood that each specific term includes all technical equivalents which operate in a similar manner to accomplish a similar purpose.

DESCRIPTION OF THE PREFERRED EMBODIMENTS

In order to facilitate the description of the present invention, the exothermic compositions will initially be described and then the heat collars in which the compositions are advantageously employed will subsequently be described in detail.

The exothermic compositions of the present invention are comprised of an alkaline oxide reactant and an acidic reactant. There are two types of chemical heat-producing reactions involved when the compositions of the present invention are activated by adding a small amount of water to the compositions. One of the reactions is the conversion of the alkaline oxide to the corresponding hydroxide. The other reaction is the neutralization of the acidic reactant by the alkaline hydroxide thus formed. Using calcium oxide as a typical alkaline oxide reactant and oxalic acid dihydrate as a typical acidic reactant, the exothermic heat process of the present invention can be represented by the following formulae:

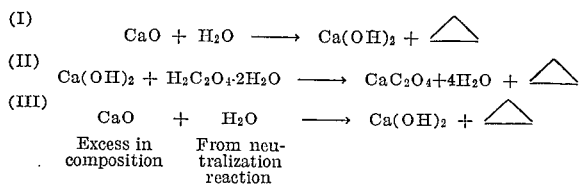

The employment of the alkaline oxide rather than the corresponding alkaline hydroxide in the exothermic compositions of the present invention has several important advantages. The initial reaction of the water with the oxide to form the hydroxide is an exothermic reaction. The additional amount of heat produced by this reaction is obtained without increasing the total weight of the reactants and, in fact, the use of the oxide rather than the hydroxide somewhat lowers the total weight of the starting material required. To obtain the same amount of heat using only the neutralization reaction would require that additional amounts of both the alkaline hydroxide and the acidic reactant be employed.

The second reaction involved in producing heat using the compositions of this invention is a neutralization reaction. In the neutralization reaction the alkaline hydroxide formed in the initial step reacts with the acidic reactant to form a salt, water, and a considerable amount of heat. The neutralization reaction by itself has several limitations. In order for neutralization to take place, an ionization liquid, which in most cases is water, is required. The necessity of having liquid water present for neutralization considerably limits the upper temperature which can be produced by the neutralization reaction. If the temperature of the reaction goes above the boiling point of the ionization liquid, the ionization liquid will evaporate and the neutralization reaction will slow down and then stop when the ionization liquid is completely evaporated. The above-described problem encountered with the neutralization reaction limits the temperatures which can be obtained by the neutralization process alone to about the boiling point of water, that is, 212° F.

It has been found, however, that, by adding excess amounts of the alkaline oxide over the amount required for neutralization of the acidic reactant, much higher temperatures can be obtained, for example, temperatures up to almost 600° F. The excess amount of the alkaline oxide reacts with the water produced by the neutralization reaction. Unlike the neutralization reaction, however, the reaction of the alkaline oxide with the water can readily take place, even if the water is in the form of steam.

The highest temperature which the mixture can reach can be controlled by the excess amount of the alkaline oxide that is added to the reaction mixture. Within limits, the greater the excess, the higher the temperature that is obtained. It should be carefully noted, however, that very large excesses of the oxide should not be employed, since the oxide will react with all of the water so that there will be no water available for the water-producing neutralization reaction. The exact upper limit on the amount of oxide which can be employed can readily be determined by gradually increasing the amount of the alkaline oxide reactant until the final temperature reached ceased to rise and started to decrease. The maximum amount of excess of the alkaline oxide that can be employed can also be determined by evaluating the reactants employed so as to determine the number of moles of water which will be liberated by the neutralization reaction. In addition to the water of reaction, if a hydrated acid is employed, the water of crystallization will also be liberated. An excess of the alkaline oxide sufficient to react with a substantial portion, but not all of the water, may be added. Some water must remain available for the neutralization reaction. As a general rule, depending on the degree of hydration of the acids employed, about 2–2½ times the amount of oxide required for neutralization is employed.

The chemical reactions involved when employing the compositions of the present invention are inter-related with each other. The neutralization reaction produces the water which makes it possible to have a self-propagating reaction and also produces heat. The water of the neutralization reaction is employed in the reaction of the alkaline oxide, which produces the high temperatures. Because of this inter-relation of process steps, it is possible to add a very small amount of water to initiate the exothermic reactions, which will thereafter rapidly produce the desired amount of heat.

The alkaline oxides which may be employed in the present invention are selected from the oxides of the alkali metals and the alkaline earth metals. Alkaline oxides which may be employed are, for example, barium oxide, strontium oxide, sodium oxide, potassium and lithium oxide. Particular attention is directed to the use of calcium oxide, which has certain distinct advantages, such as being relatively inexpensive and readily available.

The acidic reactant of the exothermic composition can be either an acid or a strongly acid salt. The acids and acid salts that are preferably employed in the present invention are organic or inorganic and are of a relatively low molecular weight, for example, up to about 250. It is of considerable advantage to use an acid in a hydrated form. The water of crystallization, when liberated, is available for reaction with the oxide or available for use as the ionization liquid to continue the neutralization reaction. An additional advantage of using a hydrated acid is that, when a hydrated acid is blended with the alkaline oxide reactant, a mixture is obtained in which the water of crystallization is distributed relatively uniformly throughout the mixture. This water of crystallization is not available, however, for reaction until the initial charge of water is injected into the mixture. The use of a hydrated acid makes it possible to have a self-propagating exothermic reaction which, once initiated, rapidly evolves heat.

The particular acids and acid salts that are employed in the exothermic compositions of this invention may be selected from a large class which includes, for example, sulfamic acid, tartaric acid, oxalic acid, citric acid, orthophosphoric acid, and salts such as sodium hydrogen sulfate and potassium hydrogen sulfate. The preferred acids for employment in the exothermic compositions of this invention are citric acid, and especially oxalic acid and sulfamic acid.

The acidic components can consist of a single acid or acid salt or a mixture of acids. The mixture of acids have proven to be especially valuable and, in particular, blends of sulfamic acid with either oxalic or citric acid. The major portion of the blend, for example, 55–80 mole percent, should be either hydrated oxalic or citric acid, with 20–45 mole percent being sulfamic acid.

The exothermic compositions of the present invention are prepared by simply physically mixing the alkaline oxide reactant with the acidic reactant. The rate of the reaction can be somewhat controlled by controlling the particle size of the reactants. If a faster reaction rate is desired, either one or both of the reactants should be reduced in particle size. The fastest rate of reaction is obtained when both reactants are in powdered form.

The exothermic compositions of the present invention may be employed in various applications where it is desired to have a controlled temperature between about 212° F. and about 600° F. The exothermic compositions of this invention are especially valuable because of the relatively low cost of the reactants, the ease of initiating the exothermic reaction, and the accuracy with which the final temperature can be controlled.

The exothermic compositions of this invention are especially useful in heat collars which are used to promote the cure of the thermosetting adhesives employed in making pipe joints.

The heat collar 10 is comprised of an elongated waterproof envelope 12 which is divided into two separate sections 14, 16 by a removable separating means 18, an insulating backing 20 and attaching means 22 for securing the heat collar to a pipe. The envelope 12 is made of a waterproof material such as waxed kraft paper, and more especially, a plastic film. The envelope 12 should have relatively good heat conductance since the heat produced by the exothermic reaction will be transferred through the envelope 12 to the pipe joint. Plastic materials such as polyethylene film have proven to be satisfactory for this purpose. In view of the high temperature obtained by the exothermic reaction, it is preferable to use a material which has a higher melting point than the maximum temperature reached by the exothermic reaction, since this facilitates removal of the heat pack after the exothermic reaction is completed. A material which has been found to have excellent properties for this purpose is Mylar polyester film, which is waterproof and melts at temperatures in excess of the temperatures obtained with the compositions of this invention.

The envelope 12 is separated into two sections 14, 16. The alkaline oxide reactant 24, described above, is packaged in the first section 14, and the acidic reactant 26 is packaged in the other separate section 16 of the envelope 12. The alkaline oxide reactant 24 is kept separate from the acidic reactant 26 by a removable separating means 18. As illustrated, the separating means 18 is a metal clip which can readily be removed. Other means can likewise be employed to keep the reactants separate. For example, the envelope 12 can be simply twisted. Rubber bands or string ties can also be employed. A pair of wooden sticks which are secured to each other can also be used for this purpose. The requirements for the separating means are that it must keep the reactants separate until the composition is to be used and then it must be readily released.

The heat collar 10 has an insulating backing 20. This is an important feature in that it insures that the maximum amount of heat is directed to the object to be heated. Any of the conventional insulating materials can be employed. As illustrated in FIG. 1, the insulation consists of an aluminum foil face 28 which is laminated to heavy kraft paper 30. The aluminum foil-type insulation 20 is convenient to use because its insulating properties are excellent and it has little bulk. Other types of insulation may also be employed, such as glass wool batting 32 of the type commonly used for air conditioning.

The heat collar 10 also includes attaching means 22 for securing the heat collar to the pipe joint to be heated. As illustrated, the attaching means 22 consists of a pair of wires which are twisted together to secure the heat collar 10 in position. Other types of attaching means can be employed, such as tapes 34 having adhesive surfaces. Other attaching means such as pin fasteners and clips can also be employed.

The heat collar of this invention can be made in various shapes, depending on the configuration of the area to be heated. Another type of heat collar 36 is shown which is specifically adapted to promote the cure of adhesives employed to secure saddle-type fittings 38 to pipe. This alternative type of collar 36 has the same elements as the previously-described heat collar 10. The heat collar 36 is comprised of an envelope 40 which has two separate sections 42, 44 in which the alkaline oxide reactant 24 and the acidic reactant 26 are separately packaged. The sections 42, 44 are separated by the removable clip 46. The insulating backing 20 is made of glass wool but could, of course, also be aluminum foil. The attaching means 34 of the heat collar 36 is an adhesive tape. The heat collar 36 has an aperture 48 in the center which is formed by fusing the plastic film used to make the envelope 40.

When the heat collar 36 is employed to cure saddle-type pipe fittings 38, the extension from the saddle fitting 38 is passed through the aperture 48 in the heat collar 36.

The heat collar 10, 36 of this invention is used in the following manner: The separating means 18, 46 is removed and the alkaline oxide reactant 24 and the acidic reactant 26 are mixed. The heat collar 10, 36 is then positioned on the pipe joint 50, 52 to be heated. A hypodermic needle 54 is inserted through the heat collar 10, 36 and a small amount of water is injected into the exothermic composition. If desired, several injections can be made at different positions. However, generally only one injection is required. Once the reaction starts, it is quite evident that it is proceeding because there is an evolution of steam from the heat collar 10, 36. After the exothermic reaction is completed, the spent heat collar 10, 36 can be removed, or if more convenient, left on the pipe.

The heat collar 10, 36 of this invention is made in different sizes for each diameter pipe, As a general rule, the larger the diameter of the pipe, the larger the area of the pipe which must be bonded in order to obtain a strong joint. Accordingly, the heat collars that are employed for the large diameters are larger and contain a larger quantity of the exothermic mixture than the heat collar 10, 36 used for smaller diameter pipe. The exact amount of exothermic composition required to properly heat a joint is dependent on various factors, including the material of which the pipe is made and the wall thickness of the pipe. The exact amount of the exothermic composition required is also dependent on the particular ratio of reactants that are employed in making the composition.

The amount of a given exothermic composition to properly heat a pipe joint can be determined by making a few trial joints and determining whether the adhesive, after being heated, has fully cured. The heating quality of a given amount and type of exothermic composition can also be readily evaluated by checking the temperature of the adhesive with a thermocouple to determine if the resin is heated sufficiently high to accelerate the cure of the adhesive.

The compositions of the present invention may be used for many other applications besides accelerating the cure of resins used to bond pipe joints as described above. The compositions are useful, for example, in making food packages. The food product is packed in one container and the exothermic composition in another. The exothermic composition is activated and used to heat the food. Since there is no open flame, the composition can be used under adverse conditions, such as are encountered in certain military situations.

The compositions are also useful in defrosting frozen articles. Because there is a controlled amount of heat produced, the frozen article can readily be defrosted without the danger of overheating the article, as is encountered when a blow torch or other similar tools are employed.

There are, of course, other applications in which the compositions of the present invention may be advantageously employed, which are obvious to those skilled in the art.

The particular packaging best suited for a given application is dependent on the shape of the article to be heated. It can be seen from the different heat collars configuration shown for the bell and spigot and for the saddle type pipe joint.

Example 1

A mixture was prepared consisting of 150 g. of citric acid monohydrate, 50 g. sulfamic acid and 225 g. of calcium oxide. The mixture was placed in an insulated container and 10 cc. of water were injected into the mixture. In approximately 15 minutes the temperature of the mixture rose to 590° F.

Example 2

A mixture was prepared consisting of 100 g. oxalic acid dihydrate, 75 g. of sulfamic acid and 225 g. of calcium oxide. The mixture was placed in an insulated vessel and 10 cc. of water were injected into the mixture. In about 15 minutes the temperature of the mixture rose to between 570 and 580° F.

Example 3

A mixture was prepared from 210 g. of citric acid monohydrate and 112 g. of calcium oxide. 5 cc. of water were injected into the mixture. In about 10 minutes steam rose from the mixture and the final temperature was about 390° F.

Example 4

A mixture of 56 g. of calcium oxide and 200 g. of citric acid monohydrate were prepared, and 5 cc. of water were injected into the mixture. In about 10 minutes the mixture reached a temperature of about 210–215° F.

Example 5

Bell and spigot type joints were prepared in the following manner: Sections of 2″, 3″, 4″, and 6″ diameters of epoxy fiberglass pipe having a wall thickness of 3/64″ were cooled down to 0° F. in a freezer. A bell and spigot joint was made in each length of pipe. An epoxy adhesive was employed as the bonding agent and the assembled pipe joints were put back into the freezer for 3 days. At the end of 3 days, the bonding agent had still failed to cure.

The below-described exothermic compositions were prepared for each diameter of pipe and were mixed in a package in a heat collar like that shown in FIG. 1 with the exception that the insulation was fiberglass batting rather than aluminum foil.

| | 2″ | 3″ | 4″ | 6″ |
|---|---|---|---|---|
| Oxalic acid, g | 100 | 100 | 150 | 200 |
| Sulfamic acid, g | 75 | 75 | 100 | 150 |
| Calcium oxide, g | 225 | 225 | 337 | 450 |
| Polyester envelope | 4″ x 14″ | 4″ x 18″ | 4″ x 22″ | 4″ x 30″ |
| Insulation 1″ fiberglass | 8″ x 14″ | 8″ x 18″ | 8″ x 22″ | 8″ x 30″ |

The heat packs were placed on each pipe joint while the pipes were in the freezer and 10 cc. of water were injected into each heat pack. After about 1 hour each joint was cut apart and examined, and it was found that each joint was fully cured and there was no degradation of the pipe.

We claim:

1. The exothermic composition which liberates heat on addition of water, which consists essentially of an alkaline oxide reactant selected from the group consisting of an alkali metal oxide and an alkaline earth metal oxide and a solid acidic reactant selected from the group consisting of phosphoric acid, sulfamic acid, tartaric acid, oxalic acid, and citric acid, mixtures of said acids sodium hydrogen sulfate and potassium hydrogen sulfate, said alkaline oxide reactant being present in the composition in an amount at least sufficient to neutralize all of said acidic reactant to an amount sufficient to react with substantially all of the water produced by neutralization of said acidic reactant.

2. The composition according to claim 1 wherein said alkaline oxide is selected from the group consisting of calcium oxide, barium oxide, strontium oxide, sodium oxide, potassium oxide and lithium oxide.

3. The exothermic composition according to claim 2 wherein a mixture of acids is employed, and at least one of said acids is hydrated.

4. The exothermic composition according to claim 3 wherein said mixture is comprised of sulfamic acid and a member selected from the group consisting of oxalic acid dihydrate and citric acid monohydrate.

5. The exothermic composition according to claim 4 wherein said mixture is comprised of 55–80 mole percent of a member selected from the group consisting of oxalic acid dihydrate and citric acid monohydrate and 20–45 percent of sulfamic acid.

6. The composition according to claim 5 wherein said alkaline oxide reactant is calcium oxide.

7. The composition according to claim 6 wherein said calcium oxide is present in an amount which is 2 to 2½ times the amount required to neutralize said acidic reactant.

References Cited

UNITED STATES PATENTS

| | | | |
|---|---|---|---|
| 2,513,602 | 7/1950 | Udy | 44—3 X |
| 2,591,105 | 4/1952 | Strauss et al. | 44—3 X |
| 2,961,363 | 11/1960 | Lowes | 44—3 X |
| 3,172,795 | 3/1965 | Helliwell et al. | 149—109 X |

CARL D. QUARFORTH, Primary Examiner

S. J. LECHERT, Assistant Examiner

U.S. Cl. X.R.

4—3; 252—188.3